United States Patent Office 3,133,080
Patented May 12, 1964

3,133,080
OPTICAL WHITENING AGENTS OF THE
1,3-DIARYLPYRAZOLINE TYPE
Asim Kumar Sarkar and Dennis A. W. Adams, Leeds, England, assignors to Hickson & Welch Limited, Castleford, England, a British company
No Drawing. Filed Oct. 25, 1961, Ser. No. 147,482
10 Claims. (Cl. 260—310)

This invention is concerned with novel optical whitening agents and the preparation thereof.

An object of the invention is to provide new optical whitening agents having high fluorescent efficiency and which can be used to improve polyamide, e.g., nylon, fibres under acid, alkaline or neutral conditions.

According to the invention there are provided as new compounds suitable for use as optical whitening agents 1,3-diarylpyrazolines of the general formula:

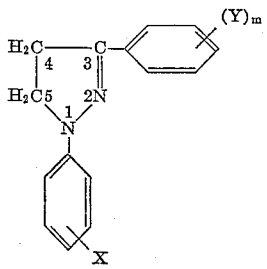

in which
X is the group —SO$_2$R, where R is an alkylene group containing at least two carbon atoms and which may be interrupted by one or more oxygen atoms, said alkylene group containing at least one hydrophilic group;
Y is a hydrogen or a halogen, e.g., chlorine, bromine or iodine, atom or an alkoxy, acylamino, alkylamino or dialkylamino group and
m is an integer from 1–5.

If more than one Y group is present these need not be identical.

The hydrophilic group of the group R is preferably a hydroxyl group but this may if desired be esterified, e.g., by a mono- or dicarboxylic acid (e.g., maleic acid), sulphuric acid or phosphoric acid.

The group R is preferably the group

—CH$_2$CHOH
    |
    R' where R' is hydrogen, an alkyl group or the group —(CH$_2$OCH$_2$)$_n$H, n being an integer, e.g., 1–5.

The substituents X and Y may have the same or different nuclear positions in their respective benzene rings but are both preferably in the ortho- or para- position, the para-position being particularly preferred in both cases.

The preparation of various preferred 1,3-diaryl-pyrazolines according to the invention is described in the examples below.

Various 1,3-diarylpyrazolines have been proposed for use as optical whitening agents. Many which are water-soluble possess the disadvantage that they have little or no whitening effect on polyamide fibres in detergent baths, i.e., under neutral or slightly alkaline conditions, although they can be used under acid conditions. Other compounds of the stated type which are insoluble cannot be applied under acid conditions. In contrast thereto the compounds of the present invention, can be used to improve polyamide fibres under acid, neutral and alkaline conditions and thus can be used in detergent as well as acid baths. The compounds according to the invention are highly fluorescent and impart a reddish-blue hue to polyamide fibres when they are treated under acid, neutral or alkaline conditions.

The compounds according to the invention may be used in admixture with a detergent of the soap or soapless type, washing agent or other textile auxiliary in suitable proportion, e.g., 0.01–0.5%, preferably 0.01–0.2% by weight.

Any convenient method for the preparation of 1,3-diarylpyrazolines may be used for preparing the compounds according to the invention. One method which we have found to be especially suitable is the condensation of a compound of the general formula $$X.C_6H_4.NH.NH_2 \qquad (II)$$

with a compound of the general formula:

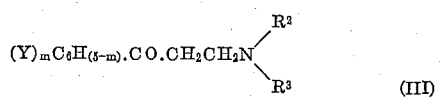

X, Y and m in these formulae, having the meanings indicated above and R$^2$ and R$^3$ each being alkyl groups, e.g., methyl or ethyl groups, or together forming a heterocyclic group with the adjacent nitrogen atom.

Alternatively in place of the compound of general Formula III there may be used a vinyl ketone of the general formula:

$$(Y)_mC_6H_{(5-m)}.CO.CH=CH_2 \qquad (IV)$$

in which Y and m have the meanings defined above.

As a further alternative, in place of the compound of general Formula III there may be used a compound of the general formula:

$$(Y)_mC_6H_{(5-m)}CO.CH_2—CH_2.Hal \qquad (V)$$

in which Y and m have the meanings defined above and Hal is a halogen atom.

Since the aryl hydrazine compound II may readily be obtained by treatment of the diazonium salt of the corresponding aryl primary amine with stannous chloride it is particularly convenient to use the resulting stannic chloride complex of the aryl hydrazine instead of the free aryl hydrazine when preparing the compounds according to the invention. The stannic chloride complex is obtained in solid form which makes it easier to handle than the free hydrazine which is a liquid.

The reaction between the aryl hydrazine II and the aryl ketone III may be effected in any convenient manner, e.g., by heating the reactants, e.g., in a solvent medium or by reaction in aqueous alkaline solution.

In order that the invention may be well understood the following examples are given by way of illustration only:

Example 1

5.1 g. stannic chloride complex of 4-(2'-hydroxy-ethylsulphonyl)-phenyl hydrazine and 2.5 g. of 3-dimethylamino-4'-chloropropiophenone hydrochloride were refluxed in 120 ml. of methoxyethanol for 7 hours. 80 ml. methoxy-ethanol was then distilled off and about 15 ml. ethanol added. The mixture was allowed to cool, and the crystalline product so obtained filtered off. The product, 1-[4'-(2''-hydroxyethylsulphonyl)phenyl]-3-(4'-chlorophenyl)-2-pyrazoline, on recrystallization gave M.P. 220–222° C.

The stannic chloride complex of 4-(2'-hydroxyethylsulphonyl)phenyl hydrazine was prepared as follows:

8 g. of 4-(2'-hydroxyethylsulphonyl)aniline was dissolved in 50 ml. of hydrochloric acid by heating. The solution was cooled rapidly under agitation to give a fine suspension of the hydrochloride. A solution of 2.76 g. of sodium nitrite in 5 ml. of water was added slowly to this suspension: when the diazotisation was complete a suspension of 18 g. of stannous chloride in 50 ml. conc.

hydrochloric acid was added slowly to the diazonium salt solution cooled to 0° C. After all the stannous chloride suspension had been added the suspension was stirred for a further 20 minutes. The product—the stannic chloride complex of the hydrazine—was then filtered off and dried.

3-dimethylamino - 4' - chloropropiophenone hydrochloride was prepared as follows:

p-Chloroacetophenone (30 g.), dimethylamine hydrochloride (23 g.) and paraformaldehyde (10.2 g.) were added to 50 ml. of ethanol and the mixture refluxed for 30 minutes after the addition of a few drops of hydrochloric acid. A further 10 g. of paraformaldehyde was then added and the mixture refluxed for a further 6 hrs. The mixture was then cooled and the precipitate filtered off. The product was then recrystallised from ethanol, M.P. 168° C.

4-(2'-hydroxyethylsulphonyl)aniline was prepared by the action of ethylene oxide on acetanilide-p-sulphinic acid and thereafter hydrolysing the acetyl group.

Nylon fabric was treated for 30 mins. at 80° C. in baths containing per litre 0.05–0.5 g. of the end-product of this example, the fabric-liquor ratio being 1:40. The rinsed dried nylon was much whiter than the untreated material. Similar effects were obtained if the bath contained detergent or dilute acid. In use the compound was dissolved in dimethylformamide and diluted with water, containing a small quantity of a non-ionic detergent, to the required volume.

*Example 2*

1-[4'-(2"-hydroxyethylsulphonyl)phenyl] - 3 - phenyl-2-pyrazoline was prepared as in Example 1 by refluxing 15 g. of stannic chloride complex of 4-(2-hydroxyethylsulphonyl)phenyl hydrazine with 5.6 g. of 3-dimethylaminopropiophenone hydrochloride in 120 ml. of ethoxyethanol for 7 hrs. At the end of the reaction 80 ml. of ethoxyethanol were distilled off and 15 ml. of ethanol added. The mixture was cooled and the precipitate filtered off. The precipitate was then crystallised from ethanol to give the above product, M.P. 175–177° C.

*Example 3*

4 - (2' - hydroxyethylsulphonyl)phenyl hydrazine (200 ml. of 0.5 M. aqueous solution as the sulphate produced as described below) and 300 ml. methanol were mixed and the solution was adjusted to pH 3 with sodium hydroxide. The solution was then refluxed with stirring and a solution of 3,4'-dichloropropiophenone in methanol (200 ml. of 0.5 M. solution) was added over 2 hrs., the pH of the solution being maintained at 3 by the addition of 20% aqueous sodium carbonate solution. The reaction mixture was refluxed for 7 hours, 500 ml. of methanol distilled off, and the product, 1-[4'-(2"-hydroxyethylsulphonyl)phenyl] - 3 - (4' - chlorophenyl)-2-pyrazoline, filtered off, washed with hot aqueous methanol and dried. M. Pt. 224–225° C.

In order to prepare the sulphate of product, 1 g. of the product was dissolved in 7.5 mls. of pyridine and 1.25 mls. of chlorosulphonic acid added to the mixture under stirring and cooling. The mixture was agitated for a further 30 mins., diluted with 150 mls. of water and acidified to Congo red with hydrochloric acid. The precipitate is filtered, washed and dried.

4 - (2' - hydroxyethylsulphonyl)phenyl hydrazine was prepared as follows:

8 g. of 4-(2'-hydroxyethylsulphonyl)aniline was dissolved in 50 ml. of hydrochloric acid by heating. The solution was cooled rapidly to give a fine suspension of the hydrochloride. A solution of 2.76 g. of sodium nitrite in 5 ml. of water was added slowly, with stirring, to this suspension and when the diazotisation was complete the solution was added rapidly to a stirred solution of sodium sulphite (30 g.) and sodium hydroxide (1.5 ml. of 47.2%) in 82 ml. of water at −5° C. The pH of the solution was adjusted to 6.5 and the solution stirred for one hour without external cooling. Sulphuric acid (7 ml. of 98%) was added and the solution boiled for three hours. The resultant solution was treated with charcoal and filtered to give a clear solution of the product.

3,4'-dichloropropiophenone was prepared by a Friedel-Crafts reaction as follows:

β-Chloropropionyl chloride (127 g.) was added dropwise over 40 mins. to a stirred suspension of anhydrous aluminium chloride (147 g.) in chlorobenzene (112.5 g.). When all the aluminium chloride had been added the flask was heated to 100° C. and kept at that temperature for 30 mins.

The reaction mixture was allowed to cool to 40–50° C. then poured slowly, with stirring, into 2 litres of water and 500 g. of ice containing 200 ml. of concentrated hydrochloric acid. The product was filtered off, washed with water and dried. M. Pt. 46–49° C.

*Example 4*

15 g. of 4-chlorophenyl vinyl ketone and 24 g. of 4-(2'-hydroxypropylsulphonyl)phenyl hydrazine dissolved in 100 ml. of ethanol acidified to pH 4 were stirred for 3 hours at 20° C. 70 ml. of ethanol was distilled off, the solution cooled and the product filtered off and dried. Recrystallisation from ethanol gave 1-[4'-(2"-hydroxypropylsulphonyl)phenyl]-3-(4' - chlorophenyl)-2-pyrazoline. M. Pt. 170–171° C.

The 4-chlorophenyl vinyl ketone was prepared by steam distillation of 3-dimethylamino - 4' - chloropropiophenone hydrochloride. The distillate was extracted with chloroform which was then dried over sodium sulphate and the solvent distilled off under reduced pressure to give the product as a pale yellow oil.

4-(2' - hydroxypropylsulphonyl)phenyl hydrazine was prepared from 4-(2'-hydroxypropylsulphonyl)aniline in an analogous manner to the preparation of 4-(2'-hydroxyethylsulphonyl)phenyl hydrazine described in Example 3.

*Example 5*

10 g. of 4-methoxyphenyl vinyl ketone and 15 g. of 4-(2'-hydroxypropylsulphonyl)phenyl hydrazine dissolved in 200 ml. of ethanol acidified to pH 3, were stirred for 8 hours at 20° C. 150 ml. of ethanol was distilled off, the solution cooled and the product filtered off and dried. Recrystallisation from ethanol gave 1-[4'-(2"-hydroxypropylsulphonyl)phenyl]-3-(4'-methoxyphenyl)-2- pyrazoline. M. Pt. 152–153° C.

The 4-methoxyphenyl vinyl ketone was prepared by steam distillation of 3-dimethylamino-4'-methoxypropiophenone hydrochloride.

*Example 6*

11.7 g. stannic chloride complex of 4-(2'-hydroxyethylsulphonyl)phenyl hydrazine and 5.8 g. of 3,4'-bis(dimethylamino)propiophenone hydrochloride were refluxed in 100 ml. methoxyethanol for 7 hours. The solution was cooled and the product, 1-[4'-(2"-hydroxyethylsulphonyl)phenyl]-3-(4'-dimethylaminophenyl)-2-pyrazoline, was filtered off and recrystallised from acetone. M. Pt. 244° C.

3,4' - bis(dimethylamino)propiophenone hydrochloride was prepared as follows:

4-dimethylaminoacetophenone (31.5 g.), dimethylamine hydrochloride (23 g.) and paraformaldehyde (10.2 g.) were added to 50 ml. of ethanol and the mixture refluxed for 30 mins. after the addition of a few drops of hydrochloric acid. A further 10 g. of paraformaldehyde was then added and the mixture refluxed for a further 6 hrs. The mixture was cooled and the product filtered off.

*Example 7*

4-(2'-hydroxyethylsulphonyl)phenyl hydrazine (200 ml. of 0.5 M. soln.) and 300 ml. methanol were mixed and the solution was adjusted to pH 3 with solid sodium carbonate. The solution was refluxed and 3-chloro-4'-acetaminopropiophenone (22.5 g.) was added over a period of 5 minutes, the pH of the solution being maintained at 3 by the addition of 20% aqueous sodium carbonate solution.

The reaction mixture was refluxed for 7 hrs., the product, 1-[4'-(2''-hydroxyethylsulphonyl)phenyl]-3-(4'-acetaminophenyl)-2-pyrazoline, filtered off, washed with hot aqueous methanol and dried. M. Pt. 230–232° C.

3-chloro-4'-acetaminopropiophenone was prepared as follows:

Acetanilide (148 g.), β-chloropropionyl chloride (127 g.) and tetrachloroethane (75 ml.) were stirred in a flask suspended in an ice bath. Aluminium chloride (280 g.) was added slowly keeping the temperature below 35° C.; when the addition was completed the temperature of the bath was raised to 55° C. When the reaction subsided, the temperature of the bath was raised to 70° C. and maintained for 3 hrs.

The reaction mixture was poured, with stirring, into 2 litres of water and 500 g. of ice containing 250 ml. of concentrated hydrochloric acid. The product was stirred for 1 hour filtered off, washed with water and dried. Recrystallisation from ethanol gave M. Pt. 154–156° C.

*Example 8*

4'-(4,7-dioxa-2-hydroxyoctylsulphonyl)phenyl hydrazine (8.5 g.) and 3,4'-dichloropropiophenone (5.5 g.) were refluxed with stirring in 150 ml. ethanol acidified to pH 4 for 11 hrs. The solution was cooled and the product, 1-[4'-(4'',7''-dioxa-2''-hydroxyoctylsulphonyl)-phenyl]-3-(4'-chlorophenyl)-2-pyrazoline, filtered off and dried. M. Pt. 117–118° C.

4'-(4,7-dioxa-2-hydroxyoctylsulphonyl)phenyl hydrazine was prepared from 4'-(4,7-dioxa-2-hydroxyoctylsulphonyl)aniline in an analogous manner to the preparation of 4-(2'-hydroxyethylsulphonyl)phenyl hydrazine described in Example 4.

*Example 9*

10.5 g. stannic chloride complex of 4-(2'-hydroxyethylsulphonyl)phenyl hydrazine and 5 g. 2-dimethylamino-4'-methoxypropiophenone hydrochloride were refluxed with stirring in 100 ml. methoxyethanol for 8 hrs. 75 ml. of the solvent was distilled off and the reaction mixture diluted with an equal volume of ethanol. The product, 1-[4'-(2''-hydroxyethylsulphonyl)phenyl]-3-(4'-methoxyphenyl)-2-pyrazoline, was filtered off and recrystallised from ethanol. M. Pt. 170–172° C.

3-dimethylamino-4'-methoxypropiophenone hydrochloride was prepared from 4-methoxyacetophenone by the same method as 2-dimethylamino-4'-dimethylaminopropiophenone as described in Example 6.

*Example 10*

9.4 g. of 4'-(4,7,10-trioxa-2-hydroxyundecylsulphonyl)phenyl hydrazine and 6.8 g. 3,4'-dichloropropiophenone were refluxed with stirring in 200 ml. ethanol acidified to pH 3 for 6 hrs. The solvent was distilled off under reduced pressure to give the product, 1-[4'-(4'',7'',10''-trioxa-2''-hydroxyundecylsulphonyl)phenyl]-3-(4'-chlorophenyl)-2-pyrazoline, as a viscous oil.

4'-(4,7,10-trioxa-2-hydroxyundecylsulphonyl)phenyl hydrazine was prepared from 4'-(4,7,10-trioxa-2-hydroxyundecylsulphonyl)aniline in an analogous manner to the preparation of 4-(2'-hydroxyethylsulphonyl)phenyl hydrazine described in Example 3.

We claim:
1. A compound of the formula

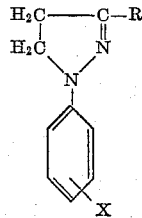

in which X is

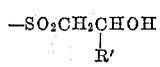

wherein R' is a member selected from the group consisting of hydrogen, methyl and —(CH$_2$OCH$_2$)$_n$H, $n$ being an integer from 1 to 5 and R is a member selected from the group consisting of

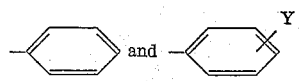

Y being a member selected from the group consisting of halogen, methoxy, acetamino and dimethylamino.

2. 1-[4'-(2''-hydroxyethylsulphonyl)phenyl]-3-(4'-chlorophenyl)-2-pyrazoline.

3. 1-[4'-(2''-hydroxyethylsulphonyl)phenyl]-3-phenyl-2-pyrazoline.

4. 1-[4'-(2''-hydroxypropylsulphonyl)phenyl]-3-(4'-chlorophenyl)-2-pyrazoline.

5. 1-[4'-(2''-hydroxypropylsulphonyl)phenyl]-3-(4'-methoxyphenyl)-2-pyrazoline.

6. 1-[4'-(2''-hydroxyethylsulphonyl)phenyl]-3-(4'-dimethylaminophenyl)-2-pyrazoline.

7. 1-[4'-(2''-hydroxyethylsulphonyl)phenyl]-3-(4'-acetaminophenyl)-2-pyrazoline.

8. 1-[4'-(4'',7''-dioxa-2''-hydroxyoctylsulphonyl)phenyl]-3-(4'-chlorophenyl)-2-pyrazoline.

9. 1-[4'-(2''-hydroxyethylsulphonyl)phenyl]-3-(4'-methoxyphenyl)-2-pyrazoline.

10. 1-[4'-(4'',7'',10''-trioxa-2''-hydroxyundecylsulphonyl)phenyl]-3-(4'-chlorophenyl)-2-pyrazoline.

References Cited in the file of this patent
UNITED STATES PATENTS

| | | |
|---|---|---|
| 2,610,969 | Kendall et al. | Sept. 16, 1952 |
| 2,639,990 | Kendall et al. | May 26, 1953 |
| 2,640,056 | Kendall et al. | May 26, 1953 |
| 2,740,793 | Kendall et al. | Apr. 3, 1956 |

FOREIGN PATENTS

| | | |
|---|---|---|
| 698,253 | Great Britain | Oct. 14, 1950 |

OTHER REFERENCES

Australia Abstract, 42,830, October 29, 1958.
Rodd: Chemistry of Carbon Compounds, N.Y., Elsevier, vol. 4, Part A, 1957, pp. 261–62.